3,043,661
REMOVAL OF IRON FROM AQUEOUS CONCENTRATED ALKALI METAL HYDROXIDE SOLUTIONS
William I. Childs, Portville, N.Y., assignor to The Dow Chemical Company, Midland, Mich., a corporation of Delaware
No Drawing. Filed Mar. 31, 1961, Ser. No. 99,664
6 Claims. (Cl. 23—184)

This invention concerns a method for removing iron from an aqueous concentrated alkali metal hydroxide solution wherein the concentrated alkali metal hydroxide solution is contacted with a water-insoluble resin which absorbs and removes iron therefrom.

Up to the time of this invention, no ion exchange resin was known which effectively removed iron from aqueous concentrated alkali metal hydroxide solutions.

It has now been discovered in accordance with this invention that a —$CH_2$—N—methyl glucamine (hereafter abbreviated as NMG) substituted water-insoluble cross-linked copolymer of a mixture of an aromatic monomer having a vinyl group as its sole aliphatic unsaturation, preferably styrene, and a copolymerizable crosslinking agent which contains at least two $CH_2$:C: groups (preferably divinylbenzene, hereafter abbreviated as DVB) the crosslinking agent being present in molar amount equal to 0.2 to 20% of said monovinylaryl hydrocarbon, absorbs and removes iron from aqueous concentrated alkail metal hydroxide solutions. It has been discovered that as the temperature is increased from substantially room temperature to ca. 90° C., the iron is removed increasingly more effectively and more rapidly. A temperature between 70° and 90° C. is preferred.

Although this resin is known and has previously been found useful in absorbing borates from fluids, its utility in removing iron from aqueous concentrated alkali metal hydroxide solutions was most surprising, particularly since it has been believed that this resin, while removing borate from solution, leaves ions of other metals in solution; U.S. Patent 2,813,838, column 1, lines 41–43. Surprisingly, it has been found that iron is held and effectively removed by such resin from aqueous relatively concentrated alkali metal hydroxide solutions, i.e., about 15–50 weight percent sodium hydroxide or equivalent alkali metal hydroxide solution (i.e., from about 9–15% of lithium hydroxide up to a maximum of 75% francium hydroxide, dependent upon their solubilities) so that a purified alkali metal hydroxide can be recovered as a concentrated aqueous solution following treatment with the NMG resin.

Most surprising was the discovery that by raising the iron-containing alkali metal hydroxide solution to a temperature between about 70° and about 90° C., contaminant iron can be removed much more effectively and more rapidly from several times greater a volume of iron-contaminated aqueous alkali metal hydroxide than at room temperature. This improvement, attributable to an elevated operating temperature, was not predictable from conventional ion exchange and chelate exchange experience.

In practice, an aqueous concentrated alkali metal hydroxide solution containing iron impurity is contacted with the NMG resin in base (hydroxide) form. Surrounding liquor is then withdrawn from the resin to give an aqueous concentrated alkali metal hydroxide solution substantially free from iron, i.e., having from about 1 to about 5 parts per million (hereafter abbreviated as p.p.m.) or less. The iron is then eluted from the resin with dilute mineral acid. The resin is thereafter regenerated to the hydroxide form with aqueous alkali metal hydroxide.

The following examples describe specific embodiments of this invention and represent the best mode contemplated by the inventor for carrying out the invention.

*Example 1*

A quantity of 25 ml. of 50–100 mesh —$CH_2$—NMG— substituted styrene-DVB copolymer in base (hydroxide) form containing ca. 2.0 weight percent combined DVB (which can be prepared from the chloromethylated styrene-DVB base resin by reaction with NMG, as shown in U.S. Patent 2,813,838) was placed in a 50 ml. burette containing a glass wool plug in the bottom and was rinsed with deionized water. A quantity of 800 ml. of aqueous 50 weight percent sodium hydroxide at ca. 20° C. containing 26 p.p.m. by weight of iron was passed downflow through the resin bed at a flow rate of 0.25 g.p.m./ft.$^2$ (gallons per minute per square foot). Progressive 20 ml. cuts were collected and analyzed for iron. The average iron content of these cuts was 5.5 p.p.m. by weight. The iron was stripped and the resin bed was regenerated with dilute mineral acid.

*Example 2*

A quantity of 70 ml. of resin similar to that of Example 1, also in the hydroxide form, was placed in a ½-inch inside diameter cylindrical column. The column was jacketed so that heated water could be circulated around it to keep the column at a controlled temperature. The column operating temperature was raised to 80° C.±5° C. and a feed solution of freshly made aqueous 50% NaOH containing 15 p.p.m. iron (50% NaOH basis) was passed through the bed at 2.5 g.p.m./ft.$^2$. Iron content of the effluent during the run averaged about one p.p.m. After 120 bed volumes of product caustic had been produced, the iron level had risen to slightly less than 3 p.p.m. The caustic remaining in the bed was then rinsed out with one bed volume of water and the resin was regenerated at room temperature by elution with 2 bed volumes of aqueous 2-normal $H_2SO_4$ to remove the retained iron. The resin was then rinsed with 1.5 volumes of aqueous 4% NaOH to put it back in the hydroxide form. The run was then repeated with equally good results.

*Example 3*

The procedure of Example 2 was repeated with six samples of commercial aqueous 50% sodium hydroxide solution having an initial iron content varying between 14.1 to 27.5 p.p.m. In each case, caustic product was produced having iron content varying between about 1 and 2 p.p.m., 50% sodium hydroxide solution basis.

Flow rates of 0.1–1.0 g.p.m./ft.$^2$ are most generally useful at room temperature or substantially room temperature. At a temperature ranging between about 70° and about 90° C., however, a considerably more advantageous flow rate of 4 g.p.m./ft.$^2$ can be used. A simple test run suffices to indicate what flow rate is desirable for a given set of conditions.

This application is a coninuation-in-part of application Serial No. 793,970, filed February 18, 1959, now abandoned.

What is claimed is:

1. The method for absorbing and removing iron from an aqueous concentrated alkali metal hydroxide solution containing iron by contacting said solution at a temperature between about 20° and about 90° C. with an insoluble crosslinked copolymer of a mixture of a monovinylaryl monomer having the vinyl group as its sole aliphatic unsaturation and a copolymerizable crosslinking agent which contains at least two groups of the structure $CH_2$:C:, said crosslinking agent being present in molar amount equal to 0.2 to 20% of said monovinylaryl monomer, said copolymer having attached to the aryl nuclei thereof —$CH_2$—N- methyl glucamine groups in the hydroxide form and removing the surrounding alkali metal hydroxide solution from said copolymer.

2. The method of claim 1 wherein the alkali metal hydroxide solution is a 15–50 weight percent sodium hydroxide solution.

3. The method of claim 1 wherein the monovinylaryl monomer is styrene and the crosslinking agent is divinylbenzene.

4. The method for absorbing and removing iron from an aqueous concentrated alkali metal hydroxide solution containing iron by contacting said solution at a temperature between about 70° and about 90° C. with an insoluble crosslinked copolymer of a mixture of a monovinylaryl monomer having the vinyl group as its sole aliphatic unsaturation and a copolymerizable crosslinking agent which contains at least two groups of the structure $CH_2{:}C{:}$, said crosslinking agent being present in molar amount equal to 0.2 to 20% of said monovinylaryl monomer, said copolymer having attached to the aryl nuclei thereof $—CH_2—$N-methyl glucamine groups in the hydroxide form and removing the surrounding alkali metal hydroxide solution from said copolymer.

5. The method of claim 4 wherein the alkali metal hydroxide solution is a 15–50 weight percent sodium hydroxide solution.

6. The method of claim 4 wherein the monovinylaryl monomer is styrene and the crosslinking agent is divinylbenzene.

References Cited in the file of this patent

UNITED STATES PATENTS

| | | |
|---|---|---|
| 2,789,036 | Tillman | Apr. 16, 1957 |
| 2,813,838 | Lyman et al. | Nov. 19, 1957 |